United States Patent
Burkhart et al.

(10) Patent No.: US 6,454,083 B2
(45) Date of Patent: Sep. 24, 2002

(54) CONVEYOR BELT IMPACT CRADLE WITH ADJUSTABLE WING MEMBERS

(75) Inventors: James R. Burkhart, Kewanee; Corey A. Noord, Prophetstown; Gary D. Swearingen, Kewanee, all of IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 09/887,209

(22) Filed: Jun. 22, 2001

Related U.S. Application Data

(60) Provisional application No. 60/216,049, filed on Jul. 5, 2000.

(51) Int. Cl.$^7$ .............................................. B65G 15/08
(52) U.S. Cl. ....................................... 198/823; 198/841
(58) Field of Search ................................. 198/823, 841

(56) References Cited

U.S. PATENT DOCUMENTS

| | | |
|---|---|---|
| 4,789,056 A | 12/1988 | Bourbeau |
| 4,793,470 A | 12/1988 | Andersson |
| 4,898,272 A | 2/1990 | Swinderman et al. |
| 5,350,053 A | 9/1994 | Archer |
| 5,368,154 A | 11/1994 | Campbell |
| 5,467,866 A | 11/1995 | Swinderman |
| 5,927,478 A | 7/1999 | Archer |
| 5,988,360 A | 11/1999 | Mott |

OTHER PUBLICATIONS

Martin Engineering, Technical Data Guardabelt Impact Cradle with Trac–Mount Design, Form No. 3298–02–12/97, Dec. 1997.
Martin Engineering, Martin Guardabelt Impact Cradle Operator's Manual, Form No. M3320–11/97, Nov. 1997.

*Primary Examiner*—Joseph E. Valenza
(74) *Attorney, Agent, or Firm*—Lee, Mann, Smith, McWilliams, Sweeney & Ohlson

(57) ABSTRACT

An impact cradle for supporting a moving conveyor belt. The impact cradle includes a plurality of support structures. Each support structure includes an elongate support member and first and second wing cushion support members for supporting impact bars. Each wing cushion support member includes a first end including a plurality of apertures and a second end including a plurality of apertures. Each aperture in the first end of a wing cushion support member is spaced apart a uniform distance from a counterpart aperture in the second end of the wing cushion support member. A first fastener and a second fastener are inserted respectively through a selected pair of counterpart apertures to connect the first and second ends of the wing cushion support member to the support member. Each pair of counterpart apertures is adapted to dispose the wing cushion support member at a selected inclined angle with respect to the support member to conform to the inclined edges of the conveyor belt. An adjustment member is disposed between the first end of each wing cushion support member and the support member to provide a selective incremental increase or decrease in the inclined angle of the wing cushion support member.

14 Claims, 3 Drawing Sheets

CONVEYOR BELT IMPACT CRADLE WITH ADJUSTABLE WING MEMBERS

RELATED APPLICATIONS

This application claims the benefit of U. S. Provisional Application No. 60/216,049, filed Jul. 5, 2000.

BACKGROUND OF THE INVENTION

The present invention is directed to an impact cradle for supporting a moving conveyor belt in the load zone of a conveyor, and in particular to an impact cradle having pivotally adjustable wing cushion support members adapted to conform to the configuration of the conveyor belt.

Impact cradles are located underneath the material carrying run of a moving conveyor belt in the load zone of a conveyor where material is loaded onto the conveyor belt. The impact cradle absorbs the impact force created by material falling onto the moving conveyor belt and prevents the belt from sagging and stretching between idler rollers which rotatably support the moving conveyor belt. Impact cradles also assist in maintaining the edges of the conveyor belt in contact with skirt boards to prevent material from flowing over the edge of the belt and to keep the dispersion of dust to a minimum. Impact cradles improve the containment of dust in the load zone of a conveyor and reduce impact damage to the conveyor belt. Idler rollers are positioned adjacent to the impact cradle. The idler rollers rotatably support the moving conveyor belt and typically form the belt into a trough-shaped cross-section such that the conveyor belt has inclined edge portions. Pursuant to CEMA standards, the inclined edge portions of troughed conveyor belts are inclined at an angle of either twenty degrees, thirty-five degrees or forty-five degrees. It has been found desirable to provide an impact cradle that can be used with a conveyor belt having any of these three trough angles.

SUMMARY OF THE INVENTION

An impact cradle for supporting a moving conveyor belt. The impact cradle includes one or more support structures. Each support structure includes an elongate support member having a first end and a second end, a first wing cushion support member and a second wing cushion support member. The first wing cushion support member includes a first end including a first aperture, a second aperture and a third aperture, and a second end including a fourth aperture, a fifth aperture and a sixth aperture. The first aperture and the fourth aperture are counterpart apertures spaced apart a selected distance. The second aperture and the fifth aperture are counterpart apertures spaced apart the same selected distance, and the third aperture and the sixth aperture are counterpart apertures spaced apart the same selected distance. A first fastener is inserted through a selected one of the first aperture, second aperture and third aperture to connect the first end of the first wing cushion support member to the support member. A second fastener is inserted through the fourth aperture, fifth aperture or sixth aperture, whichever is the counterpart to the selected aperture through which the first fastener is inserted. The second fastener connects the second end of the first wing cushion support member to the support member. When the first and second fasteners are inserted respectively through the first and fourth apertures, the first wing cushion support member is disposed at a first inclined angle with respect to the support member. When the first and second fasteners are inserted respectively through the second aperture and the fifth aperture the first wing cushion support member is disposed at a second inclined angle with respect to the support member. When the first and second apertures are inserted respectively through the third aperture and the sixth aperture the first wing cushion support member is disposed at a third inclined angle with respect to the support member. One or more impact bars are connected to the first wing cushion support member for supporting the moving conveyor belt. The second wing cushion support member is constructed in the same manner as the first wing cushion support member and is selectively connected to the support member in the same manner as the first wing cushion support member.

The impact cradle may include a first adjustment member that connects the first end of the first wing cushion support member to the support member. The first adjustment member is selectively rotatable about a first axis and includes a bore adapted to receive the first fastener. The bore of the first adjustment member includes a second axis that is offset from and generally parallel to the first axis of the adjustment member. Selective rotation of the first adjustment member about the first axis selectively increases or decreases the angle at which the first wing cushion support member is inclined with respect to the support member. A second adjustment member similarly connects the first end of the second wing cushion support member to the support member. The first and second wing cushion support members may thereby be selectively positioned at the desired inclined angle with respect to the support member to align with the inclined edge portions of the conveyor belt.

BRIEF DESCRIPTION OF THE DRAWING FIGURES

FIG. 1 is a perspective view of the impact cradle of the present invention shown supporting a conveyor belt.

FIG. 2 is a front elevational view of the impact cradle shown in FIG. 1.

DETAILED DESCRIPTION OF THE PREFERRED EMBODIMENT

Figures 1, 2:
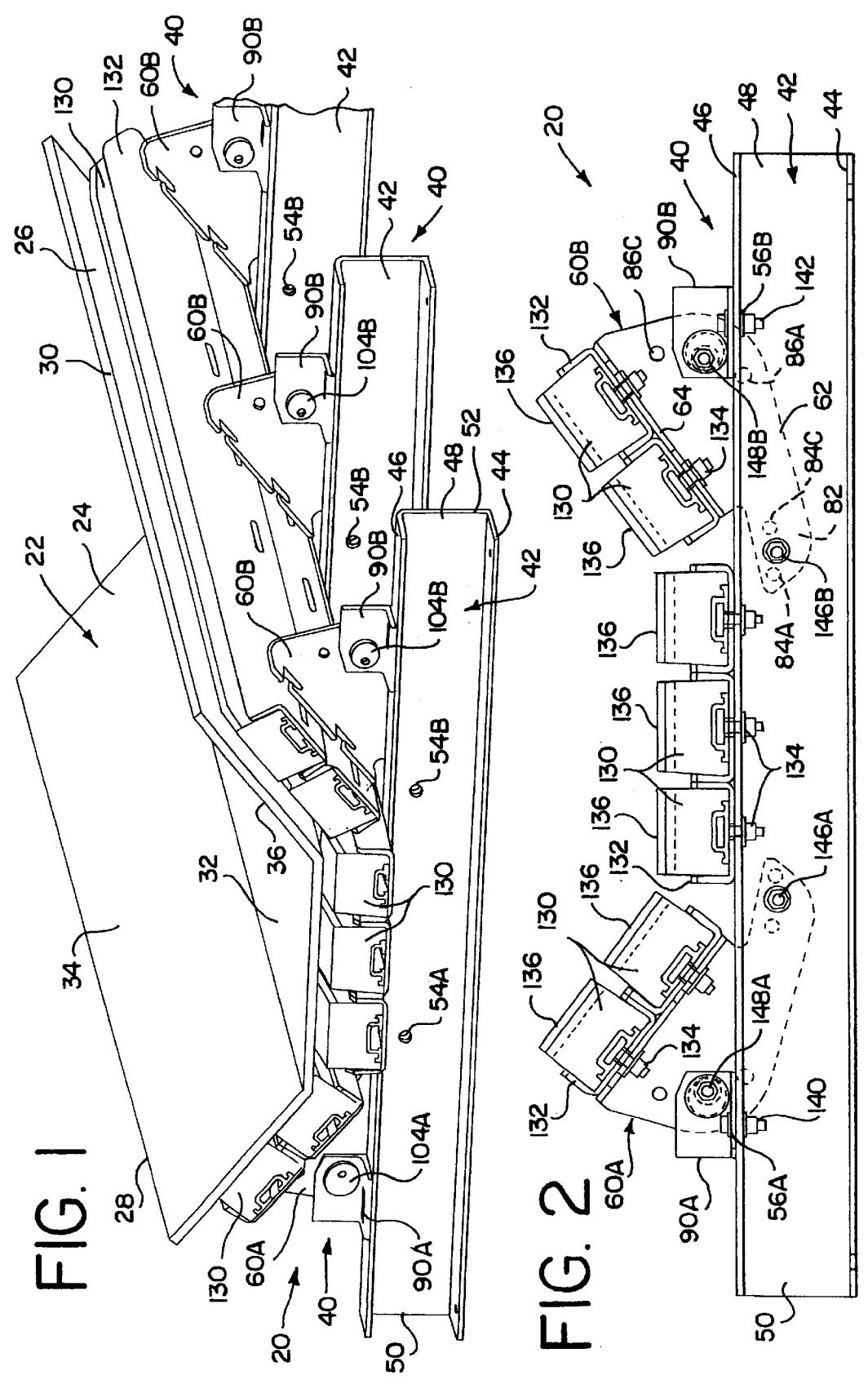
Figure 3:
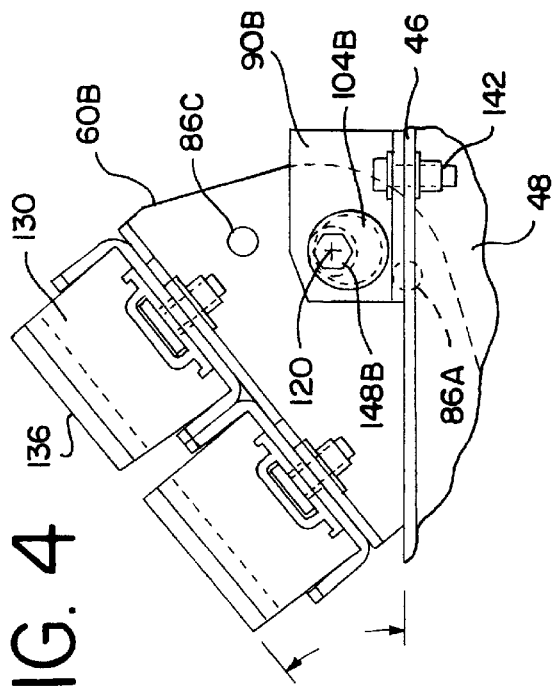
FIG. 3 is a partial front elevational view of a wing cushion support member of the impact cradle and of an adjustment member shown in its fully lowered position.

The impact cradle 20 of the present invention as shown in FIG. 1 is a support mechanism for supporting a moving conveyor belt 22 of a conveyor mechanism. The conveyor belt 22 includes a top load carrying run having a top surface 24 and a bottom surface 26 which extend laterally between a first edge 28 and a second edge 30. The conveyor belt 22 is generally trough-shaped in configuration including a generally horizontal center portion 32, a first inclined edge portion 34 which extends from the first edge 28 to the center portion 32, and a second inclined edge portion 36 which extends from the second edge 30 to the center portion 32.

The impact cradle 20 includes a plurality of support structures 40. Each support structure 40 includes an elongate support member 42 such as a generally C-shaped channel as shown in FIG. 1. The support member 42 may alternatively be formed from beams, tubular members or other types of members as are well known in the art. As shown in FIG. 1, the support member 42 includes a bottom flange 44, a top flange 46 and a web 48. The top flange 46 includes a horizontal top surface. The bottom flange 44 includes one or more apertures adapted to enable the support member 42 to be attached to the conveyor mechanism or other stationary structure. The support member 42 extends from a first end 50 to a second end 52. The web 48 includes a pair of spaced-apart apertures 54A–B which are located a uniform distance downwardly from the top flange 46. The top flange 46 of the support member 42 includes a pair of spaced apart apertures 56A–B.

Figure 7:
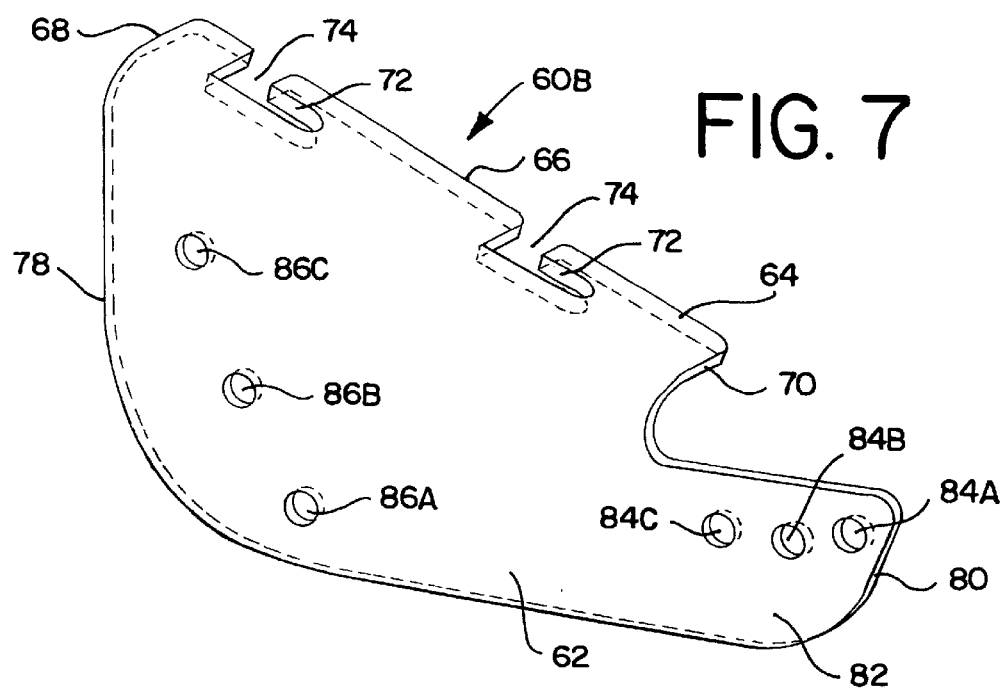
FIG. 7 is a perspective view of a wing cushion support member.

The support structure 40 also includes adjustable wing cushion support members 60A–B. The wing cushion support member 60B is shown in FIG. 7. Wing cushion support member 60B is a bracket having a substantially planar web 62 and a substantially planar flange 64 which extends outwardly from an upper edge of the web 62 to an edge 66. The flange 64 extends from a first end 68 to a second end 70. The flange 64 includes a plurality of apertures 72 which are preferably formed as slots. A respective notch 74 extends from one end of each aperture 72 to the edge 66 of the flange 64 such that the slots are generally L-shaped. The web 62 extends from a first end 78 to a second end 80. The first end 78 is located adjacent the first end 68 of the flange 64. The web 62 includes a tongue 82 at the second end 80 which projects outwardly beyond the second end 70 of the flange 64. The web 62 of the wing cushion support member 60B includes a plurality of apertures 84A–C in the tongue 82 adjacent the second end 80. The web 62 also includes a plurality of spaced apart apertures 86A–C adjacent the first end 78. The apertures 84A and 86A are spaced apart from one another the same distance the apertures 84B and 86B are spaced apart from one another, and the same distance the apertures 84C and 86C are spaced apart from one another, such as eight and one-half inches.

While the wing cushion support member 60B is shown as including three apertures 84A–C and three apertures 86A–C, the wing cushion support member 60B may include only two of the apertures 84A–C and only two of the apertures 86A–C, or it may include additional apertures. It is preferred that an aperture be provided at the first end 78 of the web 62 for each aperture provided at the second end 80 of the web 62. Each aperture in the first end 78 of the web 62 should be located a uniform distance from its respective counterpart aperture in the second end 80 of the web 62. The apertures 84A–C are spaced apart from one another in a direction generally extending from the second end 80 toward the first end 78 of the web 62. The apertures 86A–C are spaced apart from one another in a direction extending generally from the bottom edge of the web 62 toward the flange 64 at the top end of the web 62. The wing cushion support member 60A is constructed substantially identical to the wing cushion support member 60B other than that the wing cushion support member 60A is a left-hand version of the wing cushion support member 60B.

Figure 10:
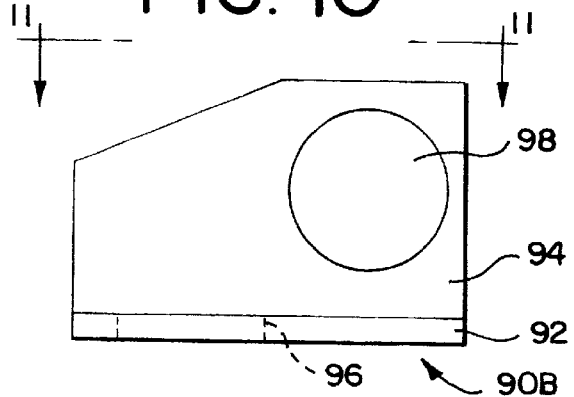
FIG. 10 is a side elevational view of an adjustment bracket.
Figure 11:
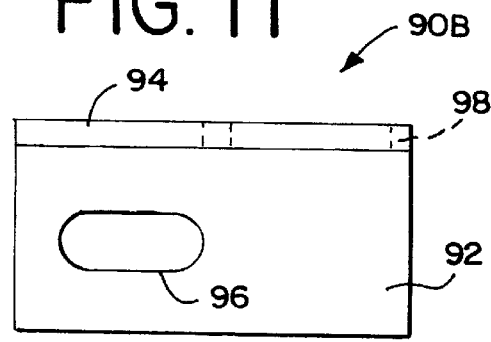
FIG. 11 is a top plan view taken along line 11—11 of FIG. 10.

The support structure 40 includes adjustment brackets 90A and B. Adjustment bracket 90B is shown in FIGS. 10 and 11. The adjustment bracket 90B includes a bottom flange 92 and a generally planar web 94 extending upwardly from the flange 92. As best shown in FIG. 11, the flange 92 includes an aperture in the form of an elongate slot 96. The slot 96 is elongated in a direction generally parallel to the web 94. The web 94 includes a circular aperture 98. The adjustment bracket 90A is constructed substantially identical to the adjustment bracket 90B other than that the adjustment bracket 90A is a left-hand version of the adjustment bracket 90B.

Figure 8:
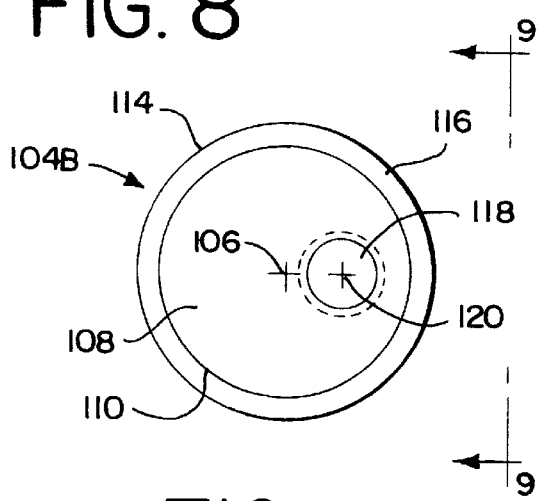
FIG. 8 is a front elevational view of the adjustment member of the impact cradle.
Figure 9:
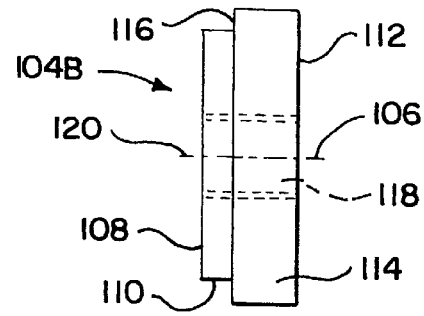
FIG. 9 is a side elevational view taken along line 9—9 of FIG. 8.

The support structure 40 also includes adjustment members 104A and B. Adjustment member 104B is shown in FIGS. 8 and 9. The adjustment member 104B includes a generally cylindrical shank 108 having a cylindrical outer surface 110 and a central longitudinal axis 106. The adjustment member 104B also includes a head 112 attached to the shank 108 that is disposed concentrically about the central axis 106. The head 112 as shown in FIGS. 8 and 9 includes a generally cylindrical outer surface 114 and a generally annular surface 116 that extends around and radially outwardly from the shank 108. The surface 114 of the head 112 may be formed in other configurations as desired, such as in a hexagonal configuration. The adjustment member 104B also includes a generally cylindrical bore 118 having a central longitudinal axis 120. The bore 118 extends through the shank 108 and the head 112. The central axis 120 of the bore 118 is spaced apart from and generally parallel to the axis 106 such that the central axis 120 of the bore 118 is offset from the central axis 106 a desired distance such as approximately 0.34 inches. The diameter of the surface 110 of the shank 108 is sized such that the shank 108 will fit closely within the aperture 98 of the adjustment bracket 90B. The adjustment member 104B is thereby selectively rotatable about the axis 106 with respect to the adjustment bracket 90B. The head 112 extends radially outwardly from the shank 108 to prevent the shank 108 from passing through the aperture 98 in the adjustment bracket 90B. An adjustment member of this general type is disclosed in U.S. Pat. No. 4,898,272 of Martin Engineering.

The impact cradle 20 includes a central cushion member which is horizontally disposed and adapted to support a central portion of the conveyor belt and first and second wing cushion members disposed on either side of the central cushion member, each wing cushion member adapted to support a side portion of the conveyor belt. As best shown in FIGS. 1 and 2, the impact cradle 20 includes one or more horizontal impact bars 130 and bar holders 132 that form a central cushion member and that are removably attached to the flange 46 of each support member 42 by fasteners 134. Each impact bar 130 includes a generally planar surface 136 which is adapted to engage the bottom surface 26 of the conveyor belt 22. These horizontal impact bars are located between the wing cushion support members 60A and B. One or more impact bars 130 and bar holders 132 that form wing cushion members are removably attached to the flange 64 of each wing cushion support member 60A by fasteners 134 which extend through the apertures 72 in the flange 64 of the wing cushion support member 60A, and one or more impact bars 130 and bar holders 132 that form wing cushion members are removably attached to the flange 64 of each wing cushion support member 60B by fasteners 134 which extend through the aperture 72 in the flange 64 of the wing cushion support member 60B. Each impact bar 130 is preferably attached to two or more support structures 40 as shown in FIG. 1. The impact bars 130 and bar holders 132 are standard pieces of equipment available from Martin Engineering.

The adjustment bracket 90A is attached to the flange 46 of the support member 42 by a fastener 140, such as a bolt and nut, and the adjustment bracket 90B is attached to the flange 46 by a fastener 142. The fasteners 140 and 142 may be selectively loosened to allow the adjustment brackets 90A and B to be slid with respect to the top flange 46 in a direction toward or away from the center of the support member 42 to the extent allowed by the length of the slot 96 in the flange 92 of the adjustment brackets 90A and B. The fasteners 140 and 142 can be selectively tightened to affix the adjustment brackets 90A and B in a fixed position with respect to the support member 42.

The wing cushion support member 60A is removably attached to the support member 42 by a fastener 146A which extends through the aperture 54A in the support member 42 and through a selected one of the apertures 84A–C in the wing cushion support member 60A. The wing cushion support member 60A is removably attached to the adjustment bracket 90A by a fastener 148A which extends through the bore 118 in the adjustment member 104A and through a selected one of the apertures 86A–C which corresponds as the counterpart to the aperture 84A–C through which the fastener 146A was inserted. The wing cushion support member 60B is removably attached to the support member 42 and to the adjustment bracket 90B in a similar manner by fasteners 146B and 148B. The web 62 of the wing cushion support members 60A–B and the head 112 of the adjustment members 104A–B are located on opposite sides of the respective webs 94 of the adjustment brackets 90A–B.

Figure 4:
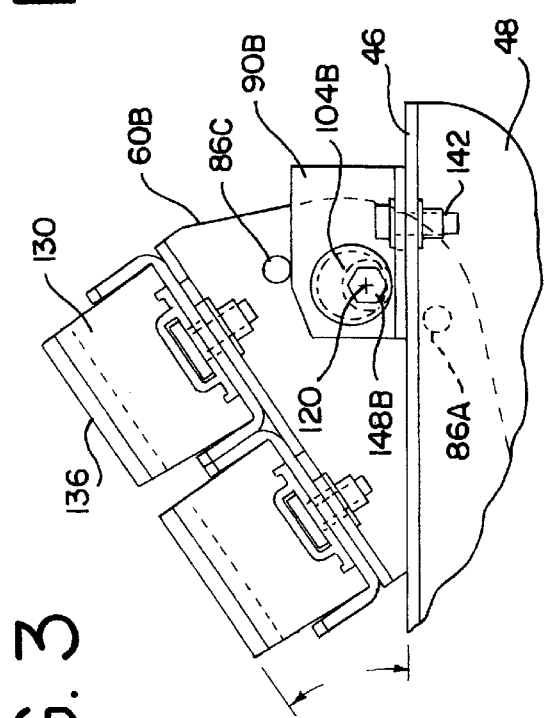
FIG. 4 is a partial front elevational view of a wing cushion support member of the impact cradle and of an adjustment member shown in its fully raised position.

As shown in FIG. 2, when the fastener 146B extends through the aperture 84B of the wing cushion support member 60B and the fastener 148B extends through the aperture 86B of the wing cushion support member 60B, the flange 64 of the wing cushion support member 60B and the surfaces 136 of the impact bars 130 attached to the wing cushion support member 60B are inclined at an angle of approximately thirty-seven degrees to the horizontal top flange 46 of the support member 42. The thirty-seven degree angle of inclination is achieved when the fastener 148B and thereby the bore 118 of the adjustment member 104B is located in a neutral or central position as shown in FIG. 2 wherein the axes 106 and 118 are in a generally horizontal plane. If desired, the angle of inclination of the wing cushion support member 60B and of the impact bars 130 attached thereto can be finely adjusted by loosening the fasteners 142, 146B and 148B. The adjustment member 104B can then be rotated in a counter-clockwise direction about the axis 106 from the neutral position as shown in FIG. 2 to a fully lowered position as shown in FIG. 3 wherein the bore 118 of the adjustment member 104B is located at the bottom of the adjustment member 104B. The adjustment member 104B may alternatively be rotated in a clockwise direction about the axis 106 from the neutral position as shown in FIG. 2 to a fully raised position as shown in FIG. 4 wherein the bore 118 of the adjustment member 104B is located at the top of the adjustment member 104B. The fastener 148B can be tightened to maintain the adjustment member 104B in any position between the fully lowered position as shown in FIG. 3 and the fully raised position as shown in FIG. 4.

As the adjustment member 104B is rotated, the adjustment member 104B will slide the adjustment bracket 90B toward or away from the center of the support member 42. Once the adjustment member 104B has been rotated to incline the wing cushion support member 60B at a desired angle, the fasteners 142, 148B and 146B can be tightened. The degree of change in the inclination of the wing cushion support member 60B and impact bars 130 attached thereto provided by rotational movement of the adjustment member 104B from its neutral position to the fully lowered position, or to the fully raised position, depends in part on the distance of the offset of the central axis 120 of the bore 118 from the central axis 106 of the adjustment member 104B, and the distance between the apertures 84B and 86B of the wing cushion support member 60B. It is preferable that rotation of the adjustment member 104B from the neutral position to the fully lowered position as shown in FIG. 3, or from the neutral position to the fully raised position as shown in FIG. 4, will provide a change in the angle of inclination of up to approximately plus or minus two and one-half degrees from the angle of inclination when the adjustment member 104B is in the neutral position. The wing cushion support member 60A is attached to the support member 42, and its angle of inclination is adjusted, in the same manner as the wing cushion support member 60B.

Figure 5:
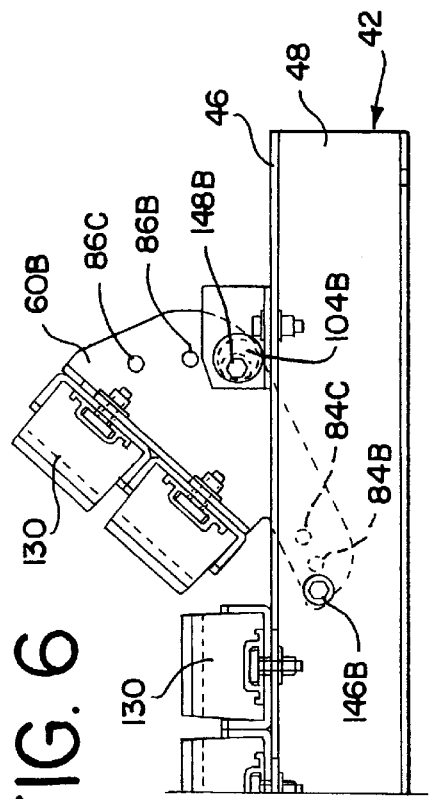
FIG. 5 is a partial front elevational view of the impact cradle showing a wing cushion support member located in a lowered position.

As shown in FIG. 5, the wing cushion support member 60B and the impact bars 130 attached thereto are inclined at an angle of approximately twenty-four degrees to the flange 46 of the support member 42 by inserting the fastener 146B through the aperture 84C in the wing cushion support member 604 and by inserting the fastener 148B through the aperture 86C in the wing cushion support member 60B. Selective clockwise or counter-clockwise rotation of the adjustment member 104B will increase or decrease the angle of inclination a desired amount as described above. The angle of inclination of the wing cushion support member 60A and of the impact bars 130 attached thereto is selected and adjusted in the same manner.

Figure 6:
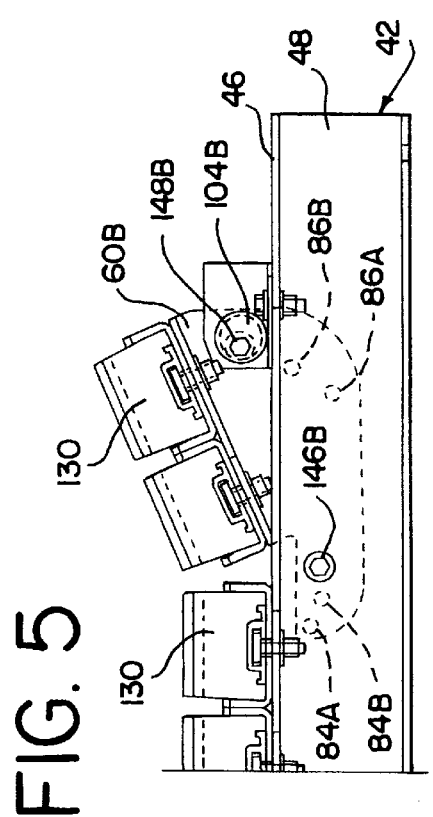
FIG. 6 is a partial front elevational view of the impact cradle showing a wing cushion support member located in a raised position.

As shown in FIG. 6, the wing cushion support member 60B and the impact bars 130 attached thereto are inclined at an angle of approximately forty-eight and one-half degrees to the flange 46 of the support member 42 by inserting the fastener 146B through the aperture 84A in the wing cushion support member 60B and by inserting the fastener 148B through the aperture 86A in the wing cushion support member 60B. Selective clockwise or counter-clockwise rotation of the adjustment member 104B will increase or decrease the angle of inclination as desired. The angle of inclination of the member 60A and the impact bars 130 attached thereto is selected and adjusted in the same manner.

Selective inclination of the wing cushion support members 60A and B can be accomplished by providing a single aperture 84A, 84B or 84C in the tongue 82 of the wing cushion support member and providing the apertures 86A–C a uniform distance therefrom. However, it has been found to be preferable to provide a plurality of apertures in the tongue 82 such as the apertures 84A–C. When the wing cushion support member 60B is set at a low angle of inclination as shown in FIG. 5, the fastener 146B is inserted through the most inward aperture 84C in the tongue 82. As the angle of inclination of the wing cushion support member 60B is increased, it is preferable to insert the fastener 146B through an aperture 84A or 84B which is located outwardly from the aperture 84C. Changing the aperture 84A–C through which the fastener 146B is inserted as the angle of inclination of wing cushion support member 60B is increased or decreased maintains the impact bars 130 that are attached to the wing cushion support member 60B properly positioned and spaced with respect to the horizontal impact bars 170 that are attached to the flange 46 of the support member 42. The angle of inclination of the wing cushion support members 60A–B and of the impact bars 170 attached thereto can be selected and adjusted as desired to match the inclination of the first inclined edge portion 34 and of the second inclined edge portion 36 of the conveyor belt 22, and the angle of inclination of the idler rollers that provide the trough shape of the conveyor belt 22.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. An adjustable impact cradle for supporting a conveyor belt including:
   a support member;
   a central cushion member associated with said support member, said central cushion member being disposed generally horizontal and adapted to support a central portion of the conveyor belt;

a first wing cushion member having a first end and a second end and a second wing cushion member having a first end and a second end, each said wing cushion member being disposed at a respective side of said central cushion member, each of said first and second wing cushion support members adapted to a respective side portion of the conveyor belt; and a first angular adjustment mechanism associated with said first end of said first wing cushion member, and a second angular adjustment mechanism associated with said second end of said first wing cushion member, said first and second angular adjustment mechanisms adapted to selectively vary the angular inclination of said first wing cushion member with respect to said central cushion member.

2. The impact cradle of claim 1 including a third angular adjustment mechanism associated with said second wing cushion member, said third angular adjustment mechanism adapted to selectively vary the angular inclination of said second wing cushion member with respect to said central cushion member.

3. The impact cradle of claim 1 including a wing cushion support member attached to said first wing cushion member, said wing cushion support member having a first end and a second end, said first angular adjustment mechanism comprising a plurality of first apertures located in said first end of said wing cushion support member for selectively connecting said first end of said wing cushion support member to said support member at a desired angle of inclination, and said second angular adjustment mechanism comprising a plurality of second apertures for selectively connecting said second end of said wing cushion support member to said support member at said desired angle of inclination.

4. The impact cradle of claim 1 wherein said central cushion member, said first wing cushion member, and said second wing cushion member each respectively comprise one or more impact bars.

5. An impact cradle for supporting a conveyor belt, said impact cradle including:
   a support member having a first end and a second end;
   a first wing cushion support member having a first end and a second end, said first end of said first wing cushion support member including a first aperture and a second aperture, said second end of said first wing cushion support member including a third aperture;
   a first fastener adapted to be inserted through said third aperture to connect said second end of said first wing cushion support member to said support member; and
   a second fastener adapted to be inserted through a selected one of said first aperture and said second aperture to connect said first end of said first wing cushion support member to said support member;
   whereby when said second fastener is inserted through said first aperture said first wing cushion support member is disposed at a first angle with respect to said support member, and when said second fastener is inserted through said second aperture said first wing cushion support member is disposed at a second angle with respect to said support member.

6. The impact cradle of claim 5 wherein said first end of said first wing cushion support member includes a fourth aperture, said second fastener adapted to be inserted through a selected one of said first aperture, said second aperture and said fourth aperture to connect said first end of said first wing cushion support member to said support member, whereby when said second fastener is inserted through said fourth aperture said first wing cushion support member is disposed at a third angle with respect to said support member.

7. The impact cradle of claim 6 wherein said second end of said first wing cushion support member includes a fifth aperture and a sixth aperture, said first fastener adapted to be inserted through a selected one of said third aperture, said fifth aperture and said sixth aperture to connect said second end of said first wing cushion support member to said support member, whereby when said first fastener is inserted through said third aperture said first wing cushion support member is disposed at said first angle with respect to said support member, when said first fastener is inserted through said fifth aperture said first wing cushion support member is disposed at said second angle with respect to said support member, and when said first fastener is inserted through said sixth aperture said first wing cushion support member is disposed at said third angle with respect to said support member.

8. The impact cradle of claim 7 wherein said first aperture and said third aperture are spaced apart a selected distance, said second aperture and said fifth aperture are spaced apart said selected distance, and said fourth aperture and said sixth aperture are spaced apart said selected distance.

9. The impact cradle of claim 5 including an adjustment member attached to said support member, said second fastener adapted to connect said first end of said first wing cushion support member to said adjustment member, said adjustment member adapted to selectively change the angle at which said first wing cushion support member is disposed with respect to said support member.

10. The impact cradle of claim 9 wherein said adjustment member includes a first axis and a bore having a second axis, said second axis being offset from and generally parallel to said first axis, said bore adapted to receive said second fastener, said adjustment member being selectively rotatable about said first axis.

11. The impact cradle of claim 10 including a bracket attached to said support member, said adjustment member being rotatably attached to said bracket.

12. The impact cradle of claim 11 wherein said bracket includes an aperture and said adjustment member includes a head and shank, said shank being rotatably located in said aperture of said bracket.

13. The impact cradle of claim 5 including one or more impact bars connected to said first wing cushion support member, said impact bars adapted to support a conveyor belt.

14. The impact cradle of claim 5 including a second wing cushion support member having a first end and a second end, said first end of said second wing cushion support member including a fourth aperture and a fifth aperture, said second end of said second wing cushion support member including a sixth aperture, a third fastener adapted to be inserted through said sixth aperture to connect said second end of said second wing cushion support member to said support member, and a fourth fastener adapted to be inserted through a selected one of said fourth aperture and said fifth aperture to connect said first end of said second wing cushion support member to said support member, whereby when said fourth fastener is inserted through said fourth aperture in said second wing cushion support member said second wing cushion support member is disposed approximately at said first angle with respect to said support member, and when said fourth fastener is inserted through said fifth aperture in said second wing cushion support member said second wing cushion support member is disposed approximately at said second angle with respect to said support member.

\* \* \* \* \*